United States Patent [19]

Grannen, III

[11] Patent Number: 4,676,731
[45] Date of Patent: Jun. 30, 1987

[54] INJECTION MOLD WITH SIDE AND END CORE LOCKS FOR FORMING A PARTITIONED CONTAINER

[75] Inventor: Walter A. Grannen, III, Bargersville, Ind.

[73] Assignee: E-W Mold & Tool Co., Inc., Indianapolis, Ind.

[21] Appl. No.: 823,528

[22] Filed: Jan. 29, 1986

[51] Int. Cl.$^4$ ............................................. B29C 45/13
[52] U.S. Cl. ..................................... 425/570; 249/64; 249/176; 264/328.8; 425/577; 425/468; 425/441
[58] Field of Search ......................... 249/64, 144, 176; 425/182, 190, 192 R, 450.1, 468, 588, 570, 577, DIG. 5, 572, 441, 443, DIG. 58; 264/328.8

[56] References Cited

U.S. PATENT DOCUMENTS

| | | | |
|---|---|---|---|
| 3,473,197 | 10/1969 | Wilds et al. | 425/468 |
| 3,509,603 | 5/1970 | Halsall et al. | 249/64 |
| 3,816,047 | 6/1974 | Mohler | 425/468 |
| 4,278,417 | 7/1981 | Wilds et al. | 425/468 |
| 4,481,161 | 11/1984 | Grannen, III | 425/468 |
| 4,570,897 | 2/1986 | Von Holdt | 249/144 |
| 4,576,568 | 3/1986 | Grannen, III | 425/577 |

Primary Examiner—Jay H. Woo
Assistant Examiner—Timothy W. Heitbrink
Attorney, Agent, or Firm—Woodard, Weikart, Emhardt & Naughton

[57] ABSTRACT

An injection mold assembly for formation of thin walled multi-partitioned plastic containers. An Array of cantileveredly mounted and spaced apart cores are extendable into a female mold assembly which includes a pair of side cavity cams and end cavity cams closeable upon the array, but spaced therefrom to form the plastic container therebetween. A plurality of side locking wedge shaped fingers are extendable into the slots spacing the cores apart. The fingers are arranged to extend into the opposite sides of the array of cores in a direction perpendicular to the longitudinal axis of the array spacing the cores apart while plastic is injected into the assembly by injectors mounted to the female mold. A pair of end pushers contact the two outermost cores in the array limiting outward movement of the cores during the injection step. The end pushers likewise extend in a direction perpendicular to the longitudinal axis of the array. In one embodiment, the fingers are moveable to and from the array by hydraulic cylinders and are moveable apart from the side cavity cams as the mold assembly is opened. In another embodiment, the fingers are removeably connected to the hydraulic cylinders and are mounted to the side cavity cams to move therewith as the mold assembly is opened.

14 Claims, 6 Drawing Figures

INJECTION MOLD WITH SIDE AND END CORE LOCKS FOR FORMING A PARTITIONED CONTAINER

BACKGROUND OF THE INVENTION

This invention is in the field of injection molding and associated tools. In E. W. Mold and Tool Company, Inc.'s two prior U.S. Pat. Nos. 3,473,197 and 3,816,047, there was disclosed an injection mold assembly for forming a thin walled multi-partitioned container, such as a battery case. The male portion of the mold included a plurality of upstanding cores spaced apart to form the battery case interior partition walls. Movement of the cores during the high pressure injection step was controlled by means of a plurality of wedge shaped members extendable along the longitudinal axis of the battery case between adjacent cores holding the cores apart. Use of such wedge shape members resulted in the formation of ridges within the case along the interior surface of the bottom wall of the case. The two aforementioned patents further disclose locking members abuttable against the two opposite ends of the array of cores in a direction perpendicular to the longitudinal axis of the battery case preventing the cores from moving outwardly.

Additional locking members have been designed to further control movement of the array of cores. In E. W. Mold Company, Inc.'s U.S. Pat. No. 4,278,417 and its allowed U.S. patent application Ser. No. 705,130 now U.S. Pat. No. 4,576,568, filed Feb. 25, 1985, there are disclosed different types of locking fingers moveably mounted on one core and extendable against an adjacent core. In U.S. Pat. No. 4,278,417, the interior locks mounted to the cores are provided in conjunction with locking members abutting the opposite ends of the array of cores without the wedge shaped members being provided which extend between cores. In the aforementioned U.S. patent application, the wedge shaped members extendable between the cores are disclosed along with the end locking members. Last, in U.S. Pat. No. 4,481,161, there is disclosed a pressure-stabilized injection mold which includes the wedge shaped members extendable between cores along with the end locking members abuttable against the array of cores.

Changes to the design of the thin walled compartment, such as a battery case, have been instituted requiring new and improved injection molds. With the decrease in size of vehicles, less space has been allocated to receive a compartment such as a battery case. Thus, it is desired to shorten the height of the battery case necessitating resting the interior cells of the battery directly against the top surface of the bottom wall of the case. It is therefore necessary to provide a completely flat top surface of the bottom wall eliminating any ridges which previously were formed by the wedged shaped members extending between the mold cores. At the same time, it is also desirable to eliminate any interior locking members mounted on one core and extending against an adjacent core. Disclosed herein is an injection mold having an array of cores which not only includes locking members positioned against the two opposite ends of the array of cores, but which further includes, in combination therewith, a plurality of wedge-shaped locking members extendable between cores in a direction perpendicular to the longitudinal axis of the battery case and elevated from the bottom wall of the case.

It is also desirable to provide a battery case having an exterior hold down flange. Such a flange is formed immediately adjacent the bottom wall of the battery case and also adjacent the locking members extending between the cores. As such, the formation of the outwardly extending flanges interferes with the normal retraction of the locking members and the opening of the mold for the removal of the formed case. Disclosed herein is a mold having side locking members which are moveable to allow proper opening of the mold without interference with the hold down flanges.

SUMMARY OF THE INVENTION

One object of the present invention is a case mold assembly comprising a frame, a female mold mounted on the frame and having a cavity for the plastic injection molding of a case, the female mold including a smooth flat interior surface, a male mold mounted on the frame and including a plurality of cores with the cores located apart forming spaces, the male mold including a longitudinal axis extending lengthwise with respect to the cores and with the male mold being movable therealong into the female mold for the formation of the case therebetween, the cores having bottom ends mounted to the frame with the cores extendable into the cavity to form interior walls extending across the case upon the plastic injection, the cores having smooth flat top ends spaced apart from the smooth flat interior surface to form a smooth flat bottom wall of the case, injection means operable to inject molten plastic between the female mold and the male mold and into the spaces and to maintain the plastic under pressure for a specified time period, end locking means mounted to the frame for limited motion transverse to the direction of the longitudinal axis and when in one position extending into endways engagement with the top ends of the outermost cores limiting outward movement thereof, and, side locking means mounted to the frame and extending in a transverse direction perpendicular to the axis and when in one position extending between the cores at a location apart from the cores thereof being the sole means extending between the cores keeping the cores spaced apart during injection of plastic.

A further object of the present invention is a separable mold assembly for injection molding a plastic container having compartments separated by thin walls comprising a male mold with a longitudinal axis and deep longitudinal slots extending transversely thereacross forming a plurality of upstanding cores to form said compartments separated by said thin walls, a female mold mounted adjacent said male mold but spaced therefrom to form said container therebetween, injector means mounted to said female mold and aligned relative to said cores to inject plastic material under pressure into said slots and between said female mold and said male mold, end locking means engageable with the outermost cores of said male mold in a direction perpendicular to said axis to limit outward movement of said cores during injection of plastic between said male mold and said female mold, a plurality of wedge shaped fingers movable from a position outward of said cores to a position in said slots in a direction perpendicular to said axis limiting relative motion between said cores, and, control means associated with said wedge shaped members being operable to move said wedge shaped members relative to said slots.

Another object of the present invention is a mold assembly adapted for the injection molding of thin-walled, multi-partitioned containers comprising a cavity member, a plurality of cantilever-mounted array of cores extending into the cavity member along a longitudinal axis, injection means on the cavity member and adjacent the free ends of the cores for injection of plastic material into spaces between the cores and between the cavity member and the cores, external core locking members reciprocally moveable in a transverse direction perpendicular to the longitudinal axis, the members being moveable from a retracted position away from the cores to an extended position in locking engagement between cores limiting relative motion between adjacent cores, and, end core locking means reciprocally moveable in a transverse direction perpendicular to the longitudinal axis and contactable against opposite ends of the cores limiting outward movement of the cores.

A further object of the present invention is a mold assembly for injection molding a plastic case including an interiorly smooth flat bottom wall without indentations, a plurality of interior partitions, a pair of side walls and a pair of end walls extending integrally therefrom comprising a male mold with a longitudinal axis being movable therealong and including an array of cores with flat distal ends to form the interiorly smooth flat bottom wall without indentations, the array having two opposite outermost cores to form the end walls and further having a plurality of spaced apart additional cores located between but spaced from the outermost cores to form the partitions, a female mold defining the exterior surfaces of the plastic case, the female mold includes side cams and end cams laterally moveable apart from the male mold to form the side walls and end walls therebetween, a pair of end pushers abuttable flush against the two opposite outermost cores to limit outward movement thereof as plastic is injected, a plurality of wedge shaped fingers extendable in a direction transverse to the axis and between the cores to keep the cores apart as the plastic is injected, and, control means connected to the end pushers and the wedge shaped fingers to move same to and from the cores.

It is an object of the present invention to provide a new and improved injection mold for the formation of battery cases.

Yet a further object of the present invention is to provide an injection mold assembly for forming a thin walled multi-partitioned battery case having exterior hold down flanges.

In addition, it is an object of the present invention to provide an injection mold for forming a case with an interior flat bottom wall with a plurality of upright cores spaced apart by side and end locking members extending against the cores in a direction perpendicular to the longitudinal axis of the case.

Related objects and advantages of the present invention will be apparent from the following description.

DESCRIPTION OF THE PREFERRED EMBODIMENTS

Figure 1:
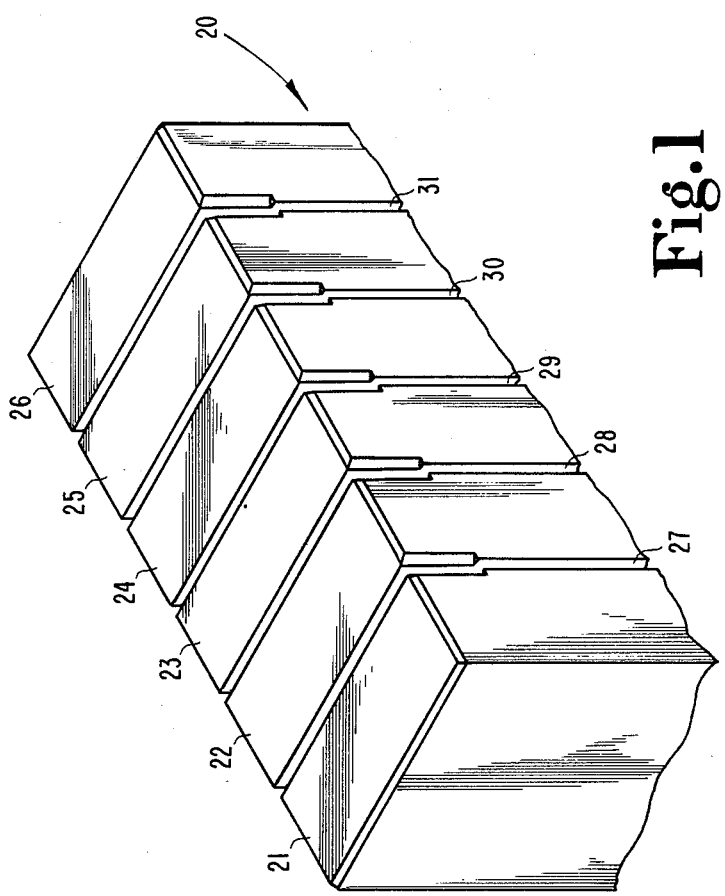
FIG. 1 is a fragmentary perspective view of a plurality of upright cores provided on the male portion of an injection mold.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
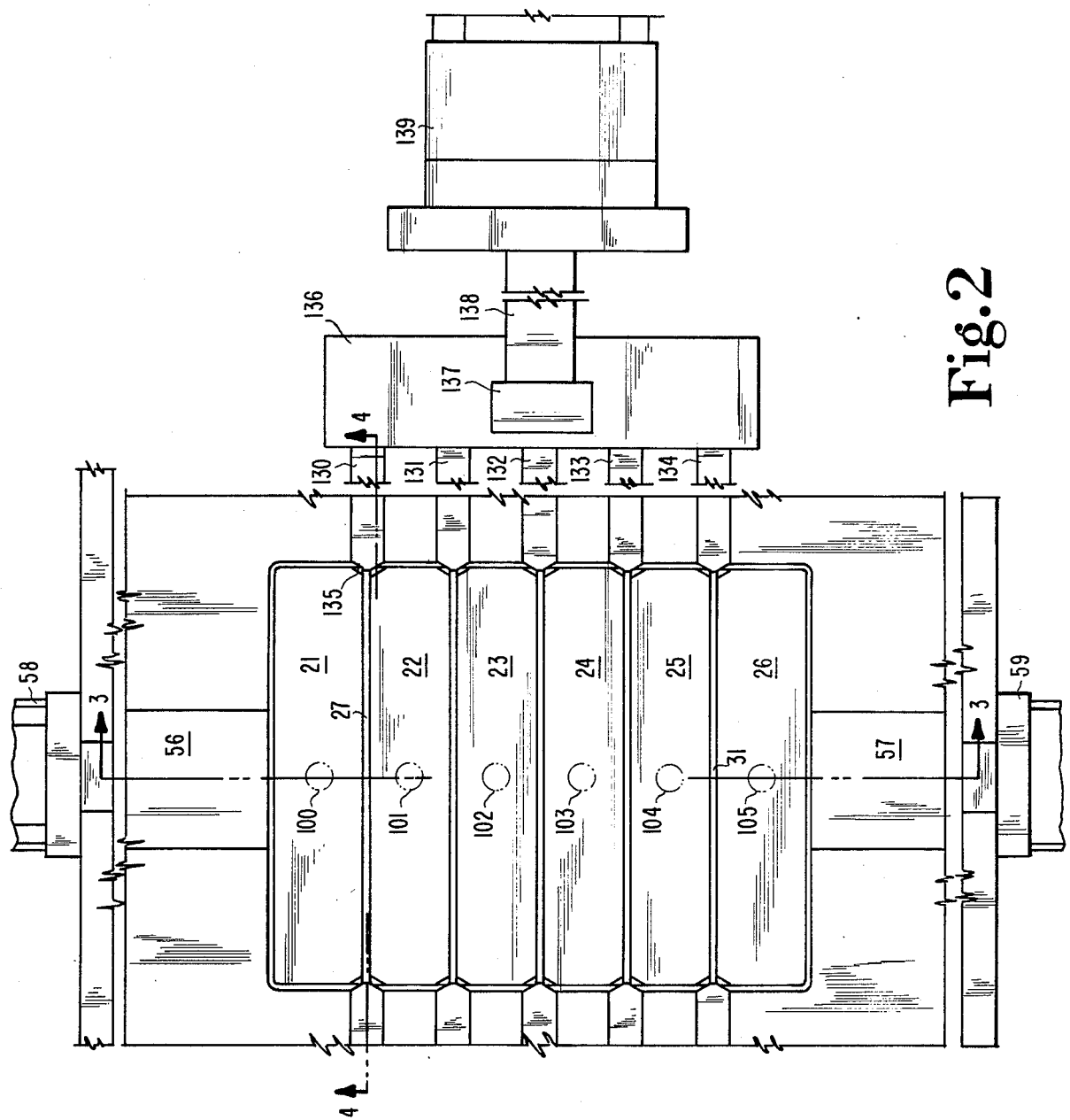
FIG. 2 is a reduced fragmentary cross-sectional view taken along the line 2—2 of FIG. 4 and viewed in the direction of the arrows showing a top view of the male mold.
Figure 3:
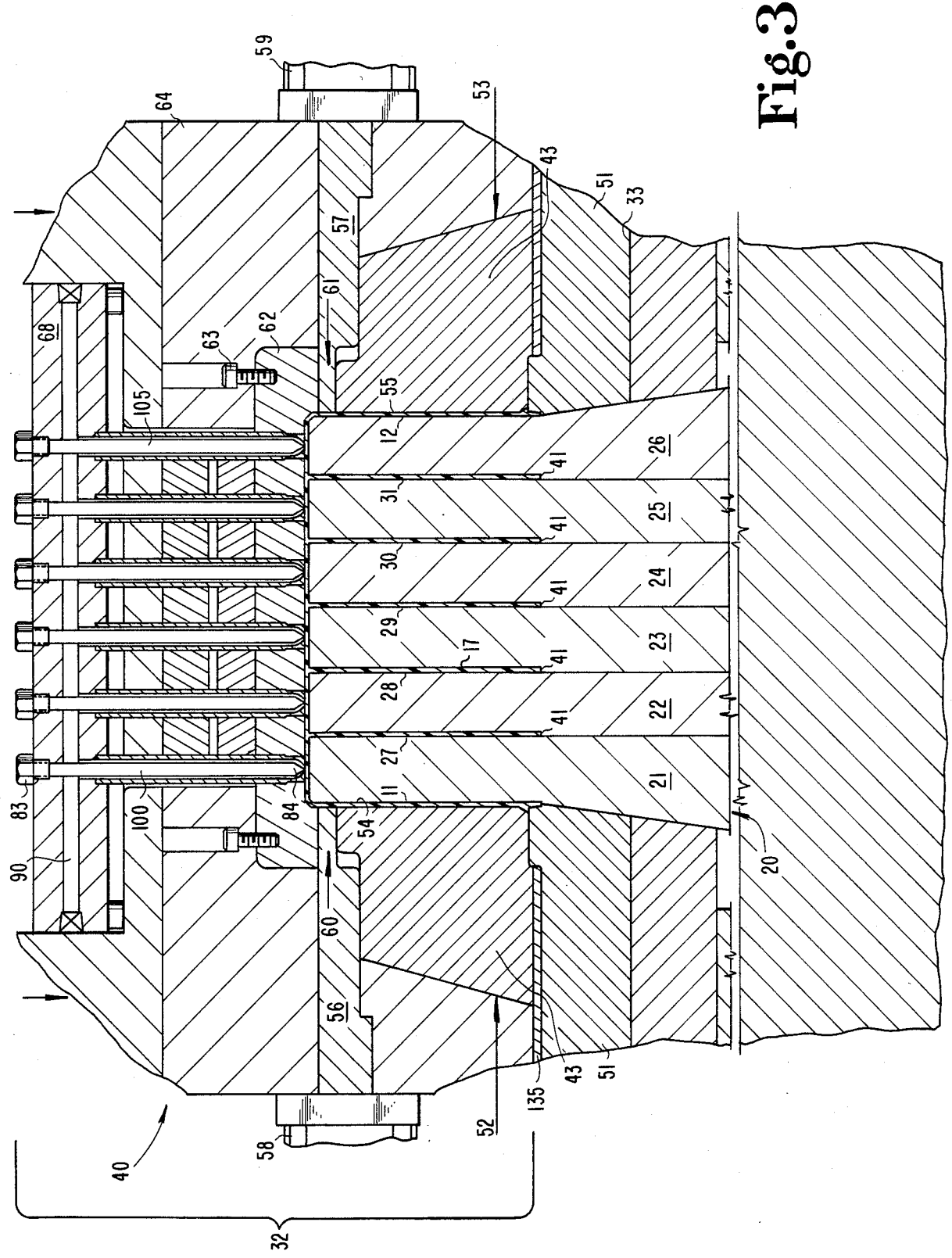
FIG. 3 is a fragmentary cross-sectional view taken along the line 3—3 of FIG. 2 and viewed in the direction of the arrows with the male mold of FIG. 1 shown inserted into the female mold.

Referring now more particularly to FIGS. 1, 2 and 3, there is shown the preferred embodiment of mold assembly 40 which includes a male mold 20 sized to fit slidably into the female mold 32 and being spaced therefrom in order to form a four sided container such as a battery case. The container has a bottom wall integrally connected to a pair of end walls 11, 12, a pair of side walls and five separate interior partitioned walls. Thus, the container includes six separate compartments into which electrical cells may be inserted. The male mold 20 has six separate cores 21-26 to form the six compartments in the battery case. The array of cores 21-26 have a longitudinal axis 35 (FIG. 4) extending centrally through the male mold. The cores are spaced apart forming slots 27-31 to form the five partitions. The distal ends of the cores are smooth and flat as is the facing surface of cap or cavity insert 62 (FIG. 3) to form the smooth and flat bottom wall of the formed container.

The six cores 21-26 of mold 20 have bottom ends fixedly mounted in cantilever fashion to a base. The top distal ends of the six cores are spaced apart forming the slots 27-31 for forming the five partitions separating the six separate compartments. Slots 27-31 terminate at location 41 forming the upper edge portion of each partition wall. Each core is in contact with an adjacent core from location 41 to the base 33 forming a rigid bottom portion of the male mold, whereas the top distal ends when not positioned within the female mold are moveable when large sideways pressure is exerted thereon.

Female mold 32 includes a pair of cavity end cams 43 slidably mounted in plate 64 that will slide atop wear plates 135 in turn mounted atop stripper plates 51. Cams 43 are moveable inwardly in the direction of arrows 52 and 53 until they are slightly spaced apart from the cores forming gaps 54 and 55 in which the end walls 11 and 12 of the container are formed. Female mold 32 further includes end locking members 56 and 57 fixedly mounted, respectively, to the extendable piston rods of hydraulic cylinders 58 and 59 which move the side locking members inwardly in the direction of arrows 60 and 61 to engage the outermost surface of the top distal ends of cores 21 and 26 preventing outward movement of the cores. The end cams 43 as well as the end locking members 56 and 57 are disclosed in my U.S. Pat. No. 3,473,197, which is herewith incorporated by reference and operate in the same manner.

Female mold 32 further includes a cavity insert 62 fixedly mounted by conventional fastening devices 63 to plate 64. A plurality of injectors 100-105 (FIGS. 2 and 3) are mounted, to plate 68 in turn secured to plate 64. The injectors are positioned over the center of each core and have a top end fixedly secured by threaded bushings 83 to plate 68. The bottom end 84 of each injector opens over the center line of the top of the core to allow plastic material to be injected into the mold. The injectors are in fluid communication with a source of pressurized plastic melt via passage 90 extending through plate 68 thereby insuring that each injector applies the same pressure to the mold assembly.

The molds shown in the drawings as compared to prior art molds do not include wedge shaped locking members which project between adjacent cores in a direction of the longitudinal axis of the cores. Instead, the locking members extend perpendicular to the longitudinal axis of the array of cores and between cores at the front and back of the array, as well as abut the opposite ends of the array. Thus, a pair of end locking members 56 and 57 (FIG. 3) are shown abutting the opposite ends of the array of cores at a location adjacent the bottom wall of the formed battery case. Likewise, two separate groups of five side locking members extend between the cores and contact the cores of the opposite sides thereof corresponding to the front and rear walls of the formed battery case immediately adjacent the bottom wall of the case. That is, a first group 128 and second group 129 (FIG. 4) of side locking members are slidably mounted to the mold assembly to engage the opposite sides of the array of cores. Group 128 will now be described, it being understood that a similar description applies to group 129. Group 128 includes five separate locking members 130 through 134 (FIG. 2) with each locking member having a pointed distal end extending between two adjacent cores at a location slightly apart from the top ends of the cores. Thus, member 130 has a pointed distal end 135 extendable into a complementary shaped groove formed in the adjacent sides of cores 21 and 22. Likewise, the remaining four locking members 131 through 134 have pointed distal ends which extend between adjacent cores to insure the cores are spaced apart during the injection molding process. Locking members 130 through 134 have proximal ends fixedly mounted to a transverse member 136 in turn slidably mounted to the distal end 137 of piston rod 138 associated with cylinder 139. Operation of cylinder 139 causes the locking members 130 through 134 to engage and disengage the array of cores. Likewise, the five locking members associated with group 129 are associated with a separate cylinder motor operable to move the locking members into engagement and out of engagement with the opposite side of the array of cores.

Figure 4:
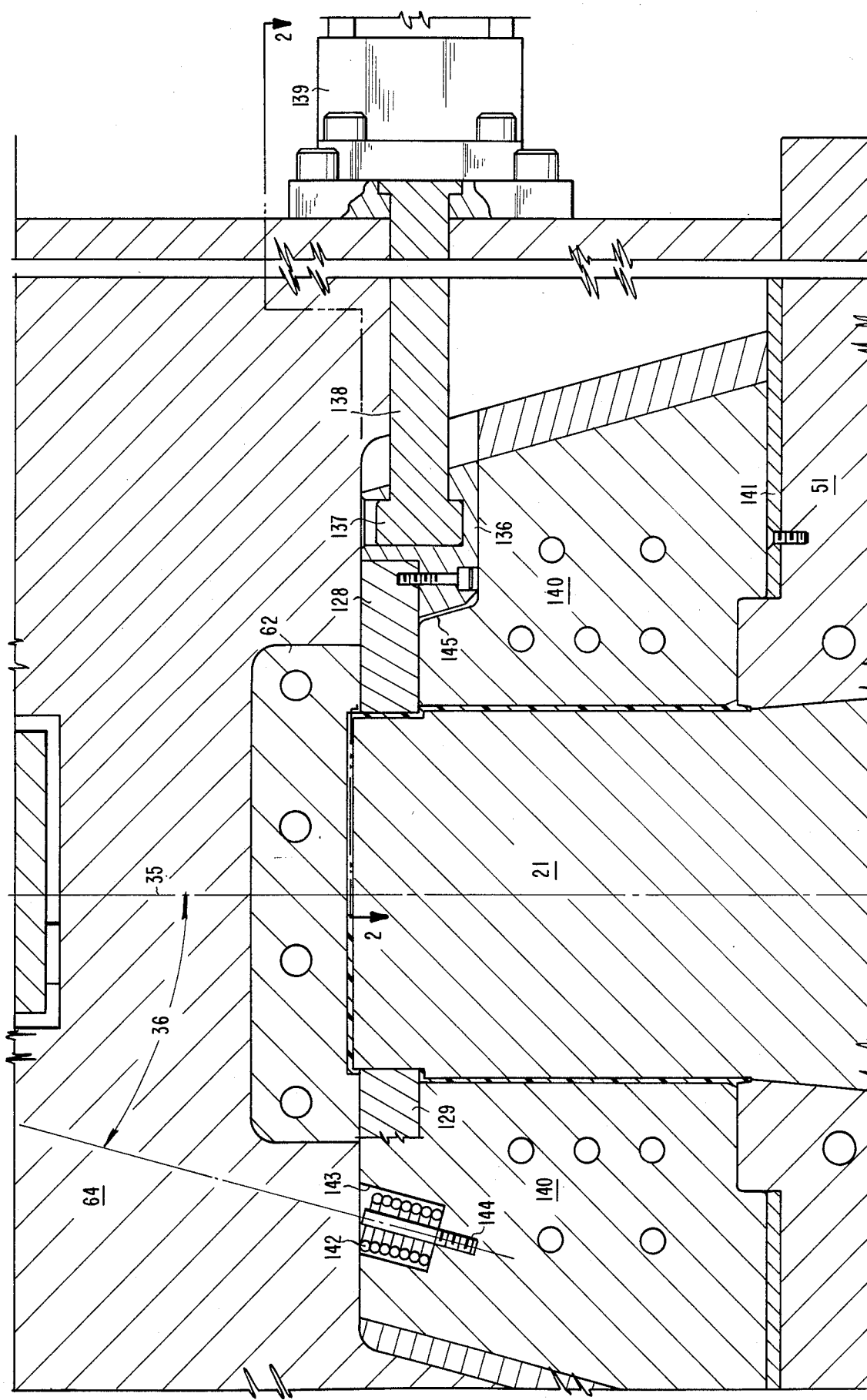
FIG. 4 is a fragmentary cross-sectional view taken along the line 4—4 of FIG. 2 and viewed in the direction of the arrows with the male mold and female mold shown in the closed position.
Figure 5:
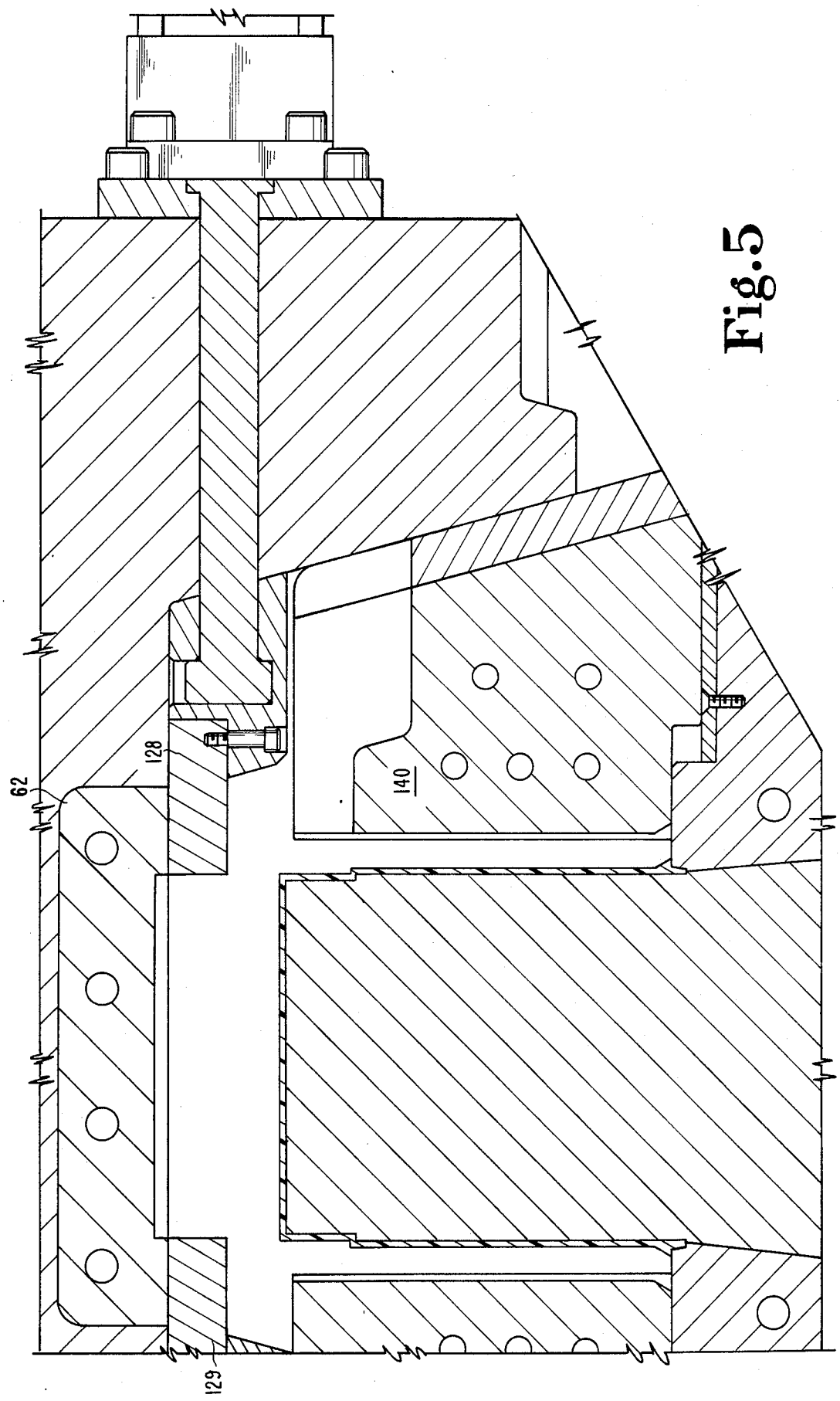
FIG. 5 is the same view as a portion of FIG. 4 only showing the mold partially opened immediately prior to cam stripper separation.

Cavity cam 140 (FIG. 4) is slidably mounted in plate 64 that will slide atop wear plates 141 in turn fixedly secured to stripper plate 51. Cavity cam 140 is moveable inwardly until it is slightly spaced apart from the cores forming gaps in which the side walls of the container are formed. A pair of helical springs 142 are each mounted within cavities 143 provided in each cam 140. Springs 142 include a longitudinal axis extending centrally therethrough which is arranged at an acute angle 36 with respect to the longitudinal axis 35 of the array of cores. A rod 144 is threadedly mounted to the cam and is centrally positioned within the cavity and positioned within the helical spring. Threaded rod 144 has a sufficiently smaller length than the cavity to not abut plate 64 whereas the top end of each helical spring contacts the bottom surface of plate 64. Rod 144 limits movement of the helical spring in case of breakage thereof. As the array of cores 21 through 26 are moved away from cap 62, cams 140 as well as the end cams 43 move apart from cap 62. Helical springs 142 extend at an approximate angle of 15 degrees relative to the longitudinal axis 35 of the array of cores thereby forcing cams 140 outwardly. The movement of cams 140 has a component parallel to the longitudinal axis of the array of cores and also a lateral component perpendicular to the longitudinal axis. FIG. 4 depicts the cams 140 and side locking members 128 and 129 in the most inward position during the injection of plastic, whereas FIG. 5 shows the position of the side locking members and cams once the mold is opened prior to stripper plates 51 separating the battery case from the array of cores.

Cam 140 includes an indented end 145 complementarily receiving transverse member 136. Once the melt is injected into the mold under high injection pressure, i.e. 16,000 psi, and before it is allowed to solidify, the cylinders are operated to disengage the end and side locking members from the array of cores allowing the plastic melt to flow under low injection pressure, i.e. 6000 psi, into the spaces occupied by the locking members. Then the plastic is solidified. Thus, transverse members 136 are moved outwardly in indentations 145 a sufficient distance to move the groups 128 and 129 of side locking members outwardly thereby also allowing the cams to move both longitudinally and laterally with respect to the array of cores without interfering with transverse members 136.

Figure 6:
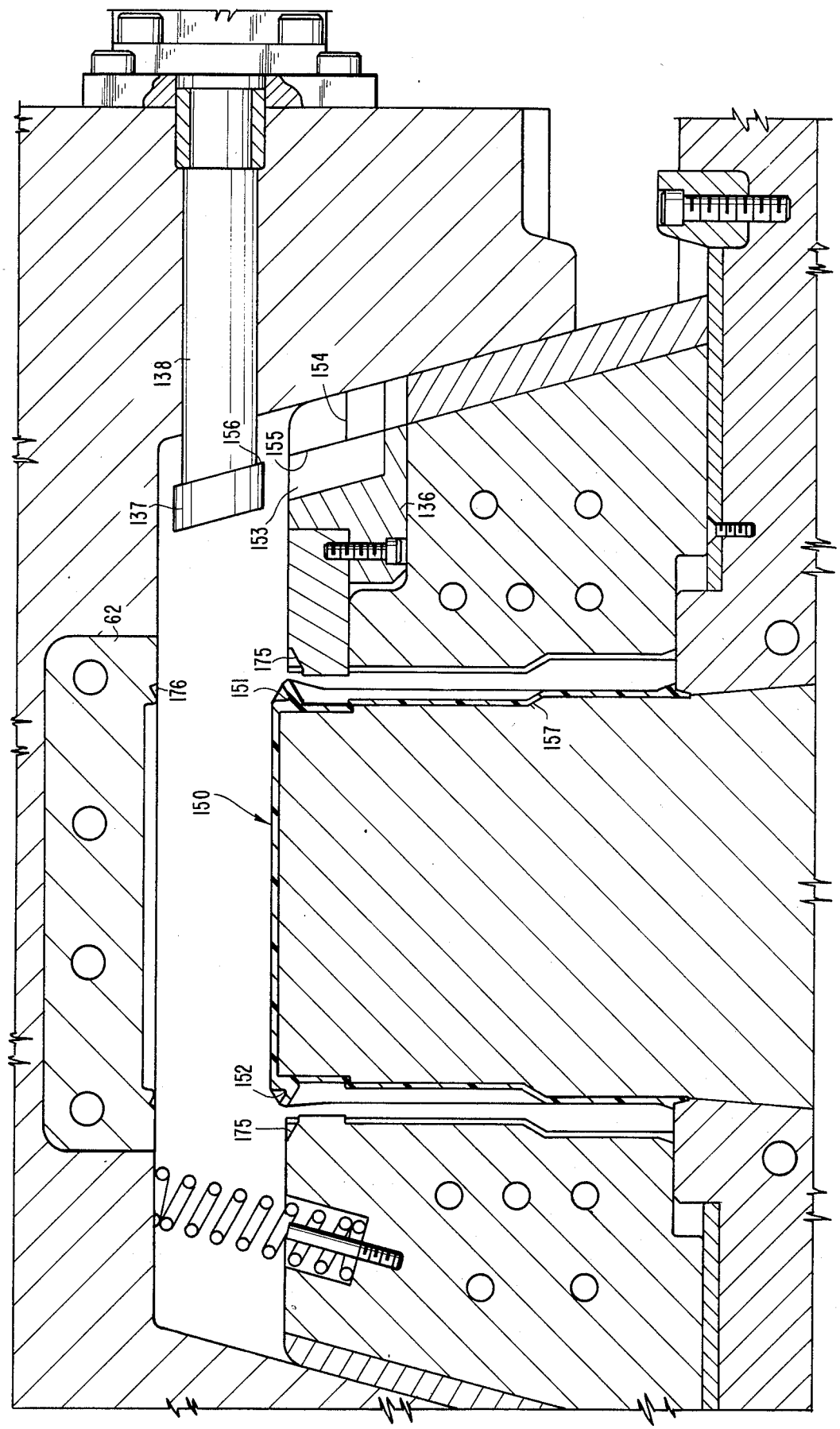
FIG. 6 is the same view as FIG. 4 only showing an alternate embodiment of the mold for forming a battery case having hold down flanges.

An alternate design of the battery case is shown in FIG. 6. Battery case 150 includes a pair of outwardly projecting hold down brackets 151 and 152 integrally joined to the case immediately adjacent the bottom wall thereof. Normally, such brackets 151 and 152 would contact both groups 128 and 129 of the side locking members as the mold is opened. Each side locking finger is provided with a recess 175 which cooperates with a second recess 176 formed in cap 62 to properly form the hold down brackets 151 and 152. Both groups 128 and 129 of side locking members shown in FIGS. 4 and 5 move only laterally with respect to the array of cores and do not move along the longitudinal axis of the cores apart from cap 62. Thus, in order to produce brackets 151 and 152, both transverse members 136 of the FIG. 6 embodiment are removably engaged with the distal ends 137 of piston rods 138. That is, transverse member 136 (FIG. 6) includes a slot 153 which slidably receives the enlarged distal end 137. The FIG. 6 transverse member 136 also includes an aperture 154 through which piston rod 138 projects with the aperture 154 and slot 153 forming a stop surface 155 for engaging the rear surface 156 of distal end 137 allowing the piston rod to withdraw the transverse member when positioned therein. In all other respects, the mold assembly shown in FIG. 6 is identical with that previously described and shown in FIG. 4 with the additional exception that the side walls of the array of cores are indented at location 157 to complementarily receive similarly configured cams providing an indented side wall in the battery case. In order to operate the mold assembly shown in FIG. 6, the melt is injected into the mold under high injection pressure, i.e. 16,000 psi, and before it is allowed to solidify, the cylinders are operated to disengage the end and side locking members from the array of cores allowing the plastic melt to flow under low injection pressure, i.e. 6000 psi, into the spaces occupied by the locking members. Then the plastic is solidified. The array of cores are then moved apart from cap 62. The helical springs within the cams force the cams to move laterally and longitudinally away from cap 62 with the transverse members 136 eventually disengaging the enlarged distal end 137 of the piston rods.

The outwardly extending side locking fingers arranged in groups 128 and 129 are retractable by the power cylinders only a distance slightly greater than the thickness of the case formed between the molds. Thus, in the embodiment of FIG. 4, the side locking fingers separate from the side cavity cams 140 as the cams move along the longitudinal axis of the cores away from cap 62.

The temperature of the melt injected into the mold assembly depends upon the type of plastic utilized. Typically the temperature of the polyolefin melt is 500° F. with the pressure exerted on the melt being between 1,500 psi to 20,000 psi. In the typical embodiment, the pressure is maintained on the melt for 6 seconds allowing the melt to flow uniformly between the molds and between the cores. Typically, the side locking fingers and end locking members remain in contact with the cores for a period of approximately 2 seconds. This time period starts with the high pressure injection stage, and concludes when the pressure is dropped to the low, or pack stage. A typical cycle for producing a battery case has a duration of 35 seconds with the first 6 seconds reserved for the injection of the plastic (2 seconds for high, and 4 seconds for low), the next 22 seconds reversed for the cooling of the melt, with the remaining 7 seconds reserved for opening of the mold assembly, ejection of the container and reclosing of the mold assembly for the formation of the next container.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A case mold assembly comprising:
a frame;
a female mold mounted on said frame, said female mold having a cavity for plastic injection molding of a case, said female mold including a smooth flat interior surface;
a male mold mounted on said frame, said male mold including a plurality of cores with said cores located apart forming slots between said cores, said male mold including a top side, a first side, a second side, a first end, and a second end, said first side oppositely disposed from said second side, said first end oppositely disposed from said second end and said first end and said second end parallel to said slots, said male mold further including a longitudinal axis an end axis, and a side axis, said longitudinal axis having a direction extending lengthwise with respect to said cores and with said male mold being movable therealong into said female mold for the formation of said case therebetween, said end axis having a direction extending perpendicular to said longitudinal axis and normal to said first end and said second end, said side axis having a direction, extending perpendicular to said end axis and said longitudinal axis, said cores having bottom ends mounted to said frame with said cores extendable into said cavity to form interior walls extending across said case upon said plastic injection, said cores having smooth flat top ends defining said top side of said male mold, said top ends spaced apart from said smooth flat interior surface to form a smooth flat bottom wall of said case;
injection means operable to inject molten plastic between said female mold and said male mold and into said slots and to maintain said plastic under pressure for a specified time period;
end locking means mounted to said frame for limited motion parallel to the direction of said end axis and when in one position said end locking means extending into endways engagement with said first end and said second end whereby outward movement outermost cores is limited; and,
side locking means mounted to said frame and extending in a direction parallel to said side axis and when in one position extending between said cores at a location apart from said cores thereof being the only means extending between said cores keeping said cores spaced apart during injection of plastic.

2. The mold assembly of claim 1 and further comprising:
transverse means having said side locking means fixedly mounted thereto; and,
cylinder means mounted to said frame and including extendable means connected to said transverse means, said extendable means being operable to move said side locking means to and from said cores.

3. The mold assembly of claim 2 wherein:
said transverse means includes a first and second member positioned on opposite sides of said cores, said side locking means includes a plurality of wedge shaped fingers mounted fixedly to said first and second members, said fingers on said first member being aligned with said fingers on said second member and are positionable to move parallel to said side axis and between said cores keeping said cores apart, said cylinder means includes a pair of hydraulic cylinders with extendable rods connected to said members for movement thereof.

4. The mold assembly of claim 3 wherein:
said cylinders are fixedly mounted to said frame with said rods fixedly connected to said first and second members for movement of said fingers only in a direction transverse to said longitudinal axis.

5. The mold assembly of claim 3 wherein:
said female mold includes a fixed position portion and side cavity cams movable therefrom, said side cavity cams cooperatively forming with said cores side walls of said case, said side cavity cams including springs mounted therein and angularly positioned with respect to said longitudinal axis to engage said fixed position portion moving said cams at an acute angle with respect to said longitudinal axis upon withdrawal of said cores.

6. The mold assembly of claim 5 wherein:

said fingers include recesses to form hold-down locking brackets on said case; and, said transverse members are removably connected to said extendable rods and disengage therefrom as said extendable rods are first withdrawn and said cores with said cams are then withdrawn limiting interference between said fingers and said brackets formed on said case.

7. The mold assembly of claim 6 wherein:
said male mold includes six of said cores.

8. A separable mold assembly for injection molding a plastic container having compartments separated by thin walls comprising:

a male mold with a longitudinal axis, an end axis, and a side axis, said longitudinal axis, said end axis, and said side axis being perpendicular to each other, said male mold including deep longitudinal slots extending transversely thereacross and parallel to said longitudinal axis and said side axis, said end axis having a direction extending normal to said slots, said slot forming a plurality of cantileverly mounted upstanding cores extending parallel to said longitudinal axis to form said compartments separated by said thin walls, said plurality of cores having outermost cores, a female mold mounted adjacent said male mold but spaced therefrom to form said container therebetween, said longitudinal axis having a direction extending lengthwise with respect to said cores and with said male mold being movable therealong into said female mold for the formation of said container therebetween, injector means mounted to said female mold and aligned relative to said cores to inject plastic material under pressure into said slots and between said female mold and said male mold;

end locking means engageable with said outermost cores of said male mold in a direction parallel to said end axis to limit outward movement of said outermost cores during injection of plastic between said male mold and said female mold;

a plurality of wedge shaped fingers movable from a position outward of said cores to a position in said slots in a direction parallel to said side axis limiting relative motion between said cores; and, control means associated with said wedge shaped members being operable to move said wedge shaped members relative to said slots.

9. A mold assembly adapted for the injection molding of thin-walled, multi-partitioned containers comprising:
a cavity member;

a plurality of cantilever-mounted cores, said cores having free ends, said cores forming deep longitudinal slots, said plurality of cores having a longitudinal axis, a side axis and an end axis, said longitudinal axis, said side axis and said end axis each being perpendicular to each other, said end axis extending in a direction normal to said slots, said plurality of cores extending into said cavity member along said longitudinal axis;

injection means on said cavity member and adjacent said free ends of said cores for injection of plastic material into spaces between said cores and between said cavity member and said cores;

external side core locking members reciprocally moveable in a transverse direction perpendicular to said longitudinal axis, said members being moveable in a first direction along said side axis from a retracted position away from said cores to an extended position in locking engagement between cores limiting relative motion between adjacent cores; and, end core locking means reciprocally moveable in a transverse direction along said end axis perpendicular to said longitudinal axis and perpendicular to said first direction, said end core locking means contactable against opposite ends of said cores limiting outward movement of said cores.

10. A mold assembly for injection molding a plastic case including an interiorly smooth flat bottom wall without indentations, a plurality of interior partitions, a pair of side walls and a pair of end walls extending integrally therefrom comprising:

a male mold having a longitudinal axis and being movable along said longitudinal axis, said male mold including an array of cores with flat distal ends to form said interiorly smooth flat bottom wall without indentations, said array having two opposite outermost cores to form said end walls and further having a plurality of spaced apart additional cores located between but spaced from said outermost cores to form said partitions;

a female mold defining the exterior surfaces of said plastic case, said female mold includes side cams and end cams laterally moveable apart from said male mold to form said side walls and end walls therebetween;

a pair of end pushers being abutable in a direction perpendicular to said longitudinal axis, said pair of end pushers further being flush against said two opposite outermost cores to limit outward movement of said two outermost cores as plastic is injected;

a plurality of wedge shaped side fingers extendable in a direction transverse to said longitudinal axis and perpendicular to said end pushers and between said cores to keep said cores apart as said plastic is injected; and, control means connected to said end pushers and said wedge shaped side fingers to move same to and from said cores.

11. The mold assembly of claim 10 wherein:
said control means includes transverse members with said side fingers fixedly mounted thereto, said control means further includes extendable power rods connected to said transverse members to extend and withdraw said fingers relative to said cores.

12. The mold assembly of claim 11 wherein:
said side cams include recesses in which said transverse members are positioned with said cams movable apart from said transverse members as said cores with cams are withdrawn.

13. The mold assembly of claim 11 wherein:
said side cams include recesses in which said transverse members are positioned with said transverse members movable apart from said rods as said cores with cams are withdrawn.

14. The mold assembly of claim 13 wherein:
molten plastic is injected between said male mold and said female mold at a pressure of approximately 16,000 psi. and thereafter a pressure of approximately of 6,000 psi.

* * * * *